US012302177B2

(12) United States Patent
Liu et al.

(10) Patent No.: US 12,302,177 B2
(45) Date of Patent: May 13, 2025

(54) METHOD FOR MEASURING WIRELESS QUALITY OF EXPERIENCE

(71) Applicant: ZTE Corporation, Guangdong (CN)

(72) Inventors: Zhuang Liu, Guangdong (CN); Dapeng Li, Guangdong (CN); Yin Gao, Guangdong (CN)

(73) Assignee: ZTE Corporation, Guangdong (CN)

( * ) Notice: Subject to any disclaimer, the term of this patent is extended or adjusted under 35 U.S.C. 154(b) by 310 days.

(21) Appl. No.: 17/822,081

(22) Filed: Aug. 24, 2022

(65) Prior Publication Data

US 2023/0134119 A1 May 4, 2023

Related U.S. Application Data

(63) Continuation of application No. PCT/CN2021/072069, filed on Jan. 15, 2021.

(51) Int. Cl.
*H04W 36/00* (2009.01)
*H04W 36/14* (2009.01)

(52) U.S. Cl.
CPC ... *H04W 36/0058* (2018.08); *H04W 36/0016* (2013.01); *H04W 36/0022* (2013.01); *H04W 36/1443* (2023.05)

(58) Field of Classification Search
CPC ......... H04W 36/0058; H04W 36/0016; H04W 36/0022; H04W 36/1443; H04W 36/0044;
(Continued)

(56) References Cited

U.S. PATENT DOCUMENTS 12,096,302 B2 * 9/2024 Basu Mallick ... H04W 36/0072
2016/0095034 A1 * 3/2016 Hampel ............. H04W 36/305
370/331
(Continued)

FOREIGN PATENT DOCUMENTS

CN 113556754 A * 10/2021
WO 2018/150249 A1 8/2018
(Continued)

OTHER PUBLICATIONS

Qualcomm Inc., "Interworking with LTE QoE," 3GPP TSG RAN WG3 #110e, e-Meeting, R3- 206175, 2 pages, Nov. 2-12, 2020.
(Continued)

*Primary Examiner* — Chi H Pham
*Assistant Examiner* — Vladislav Y Agureyev
(74) *Attorney, Agent, or Firm* — Perkins Coie LLP

(57) ABSTRACT

The end-to-end experience of a wireless customer depends on at least data throughput, data loss, and latency, as well as other characteristics. The user's quality of experience (QoE) can be determined based on applications and measurements taken at the application layer of the user's user equipment (UE) and information at the session level at the UE initiated and configured by an operator at the start of the session. The QoE is an application layer measurement configured by the operator and reported inside the application layer. When a UE is performing an inter-system handover, the QoE measurement configuration of the current session cannot be transferred from the source network to the target network.

18 Claims, 11 Drawing Sheets

(58) Field of Classification Search
CPC ......... H04W 24/08; H04W 4/00; H04W 4/50; H04L 43/065; H04L 43/0829; H04L 43/0852; H04L 43/0888; H04L 41/5067; Y02D 30/70
See application file for complete search history.

(56) References Cited

U.S. PATENT DOCUMENTS

| | | | |
|---|---|---|---|
| 2016/0142935 A1 | 5/2016 | Oettl et al. | |
| 2017/0302539 A1* | 10/2017 | Park | H04L 43/50 |
| 2018/0343659 A1* | 11/2018 | Hahn | H04W 72/0446 |
| 2019/0246323 A1* | 8/2019 | Kim | H04W 36/0058 |
| 2019/0261231 A1* | 8/2019 | Sivavakeesar | H04W 36/0066 |
| 2019/0261240 A1* | 8/2019 | Fang | H04W 68/005 |
| 2020/0022034 A1* | 1/2020 | Shi | H04W 24/10 |
| 2020/0077318 A1* | 3/2020 | Basu Mallick | H04W 36/249 |
| 2020/0100146 A1* | 3/2020 | Laitila | H04W 36/38 |
| 2020/0275319 A1* | 8/2020 | Murray | H04L 5/0048 |
| 2020/0314701 A1* | 10/2020 | Talebi Fard | H04W 36/13 |
| 2020/0413301 A1* | 12/2020 | Shi | H04W 36/08 |
| 2021/0058970 A1* | 2/2021 | Kwak | H04W 72/23 |
| 2021/0168651 A1* | 6/2021 | Marquezan | H04W 28/0838 |
| 2021/0235339 A1* | 7/2021 | Babaei | H04W 36/06 |
| 2021/0306926 A1* | 9/2021 | Pal | H04W 36/008375 |
| 2022/0052956 A1* | 2/2022 | Hu | H04B 17/364 |
| 2022/0053388 A1* | 2/2022 | Kim | H04W 76/27 |
| 2022/0078686 A1* | 3/2022 | Yiu | H04W 36/00 |
| 2022/0095260 A1* | 3/2022 | Shan | H04W 60/04 |
| 2022/0141719 A1* | 5/2022 | Shan | H04W 36/14 370/331 |
| 2022/0141751 A1* | 5/2022 | Yao | H04W 28/0861 370/331 |
| 2022/0167262 A1* | 5/2022 | Ding | H04L 67/55 |
| 2022/0182896 A1* | 6/2022 | Talebi Fard | H04W 36/0085 |
| 2022/0256415 A1* | 8/2022 | Höhne | H04L 12/413 |
| 2022/0256436 A1* | 8/2022 | Guo | H04L 69/22 |
| 2022/0279405 A1* | 9/2022 | Haghani | H04W 36/362 |
| 2023/0115085 A1* | 4/2023 | Hu | H04L 41/5067 370/252 |
| 2023/0156767 A1* | 5/2023 | Hu | H04W 24/02 370/329 |
| 2023/0247485 A1* | 8/2023 | Dévai | H04W 28/02 370/229 |
| 2023/0319528 A1* | 10/2023 | Pateromichelakis | H04W 4/44 455/420 |
| 2023/0345317 A1* | 10/2023 | Sarkar | H04W 76/15 |

FOREIGN PATENT DOCUMENTS

| | | | | |
|---|---|---|---|---|
| WO | WO-2018171918 A1 * | 9/2018 | | H04W 36/0022 |
| WO | WO-2018226238 A1 * | 12/2018 | | B60R 25/33 |
| WO | WO-2019106055 A1 * | 6/2019 | | H04L 41/0803 |
| WO | WO-2021023425 A1 * | 2/2021 | | H04W 28/0268 |
| WO | WO-2021061574 A1 * | 4/2021 | | H03M 13/1111 |
| WO | WO-2021067913 A1 * | 4/2021 | | H04W 12/06 |
| WO | WO-2021215886 A1 * | 10/2021 | | |
| WO | WO-2022082727 A1 * | 4/2022 | | |

OTHER PUBLICATIONS

Ericsson, "pCR for TR 38.890: Way Forward on Remaining Issues in NR QoE Management," 3GPP TSG RAN WG3 #110e, Online, R3-206399, 8 pages, Nov. 2-12, 2020.

International Search Report and Written Opinion for International Application No. PCT/CN2021/072069, mailed on Sep. 24, 2021 (10 pages).

* cited by examiner

METHOD FOR MEASURING WIRELESS QUALITY OF EXPERIENCE

CROSS-REFERENCE TO RELATED APPLICATION

This patent document is a continuation of and claims benefit of priority to International Application No. PCT/CN2021/072069, filed on Jan. 15, 2021. The entire content of the before-mentioned patent application is incorporated by reference as part of the disclosure of this application.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity, connectivity, and excellent user experience. Other aspects, such as energy consumption, device cost, spectral efficiency, and latency are also important to meeting the needs of various communication scenarios. Various techniques, including new ways to provide higher quality of service, improved performance across different networks, and longer battery life are being discussed.

SUMMARY

This patent document describes, among other things, methods, techniques, and apparatuses for providing a quality of experience measurement during and after a handover from one network to another.

The end-to-end experience of a wireless customer depends on at least data throughput, data loss, and latency, as well as other characteristics. The user's quality of experience (QoE) can be determined based on applications and measurements taken at the application layer of the user's user equipment (UE) and information at the session level at the UE initiated and configured by an operator at the start of the session. The QoE is an application layer measurement configured by the operator and reported inside the application layer. When a UE is performing an inter-system handover, the QoE measurement configuration of the current session cannot be transferred from the source network to the target network.

In one aspect, a method of wireless communication is disclosed. The method includes receiving, by a target node from a source node through a core network, quality of experience (QoE) area scope information and QoE configuration information that configures a QoE measurement of a wireless device. The method further includes determining, by the target node based on received QoE area scope information and QoE configuration information, a continuity of QoE measurements for the wireless device.

In another aspect, another method for wireless communications is disclosed. The method includes transmitting, by a source node to a target node, through a core network, quality of experience (QoE) area scope information and QoE configuration information that configures a QoE measurement of a wireless device.

In another aspect, another method for wireless communications is disclosed. The method includes receiving, at a wireless device from a source node, a first indication whether a target node is inside or outside an area, a second indication whether to deactivate the QoE measurement, and a third indication of allowed measured slices. The method further includes determining, by the UE, whether to stop or continue the QoE measurement.

In another aspect, a wireless communication apparatus comprising a processor configured to implement a method described herein is disclosed.

In another aspect, computer readable medium including executable instructions to implement a method described herein is disclosed.

These, and other, aspects are described in the present document.

DETAILED DESCRIPTION

Certain features are described using the example of Fifth Generation (5G) wireless protocol. However, applicability of the disclosed techniques is not limited to only 5G wireless systems.

End-to-end network performance is important to end users and operators alike. Performance aspects such as throughput, data loss, and latency affect an end user's experience. A measure of that experience is the quality of experience (QoE) measurement which can be determined based on measurements performed at the application layer of a user equipment (UE) including the measurement of throughput, data loss, and latency.

Collection of QoE information at a session level on a UE provides detailed information. The collection of QoE information is initiated and configured by an operator at the start of a session and is collected and reported at the application layer. The user does not need to know which radio access technology (RAT) such as whether the RAT is a fifth-generation (5G) new radio (NR) or a long-term evolution (LTE) RAT. The QoE measurements should be RAT independent.

However, when a UE is performing an inter-system handover such as between LTE and 5G NR or between 5G NR and LTE, the QoE measurement configuration of the current session of the UE cannot be transferred from the source serving network node (e.g, LTE enhanced Node B (eNB) to the target serving network node (e.g, NR next generation node B (gNB). Current technology does not support continuity of QoE measurements for inter-system mobility.

For an intra-LTE handover, there is the X2 interface between the source eNB and the target eNB. The source eNB forwards the configuration of the QoE measurement to the target eNB, and the target eNB can inform the UE to continue the QoE measurement.

For an inter-system handover between an LTE eNB and a NR gNB, there is no existing interface between the source eNB and the target gNB. The source eNB cannot directly forward the configuration of the QoE measurement to the target gNB. Inter-system QoE measurements continuity is not supported by current technologies.

Figure 1:
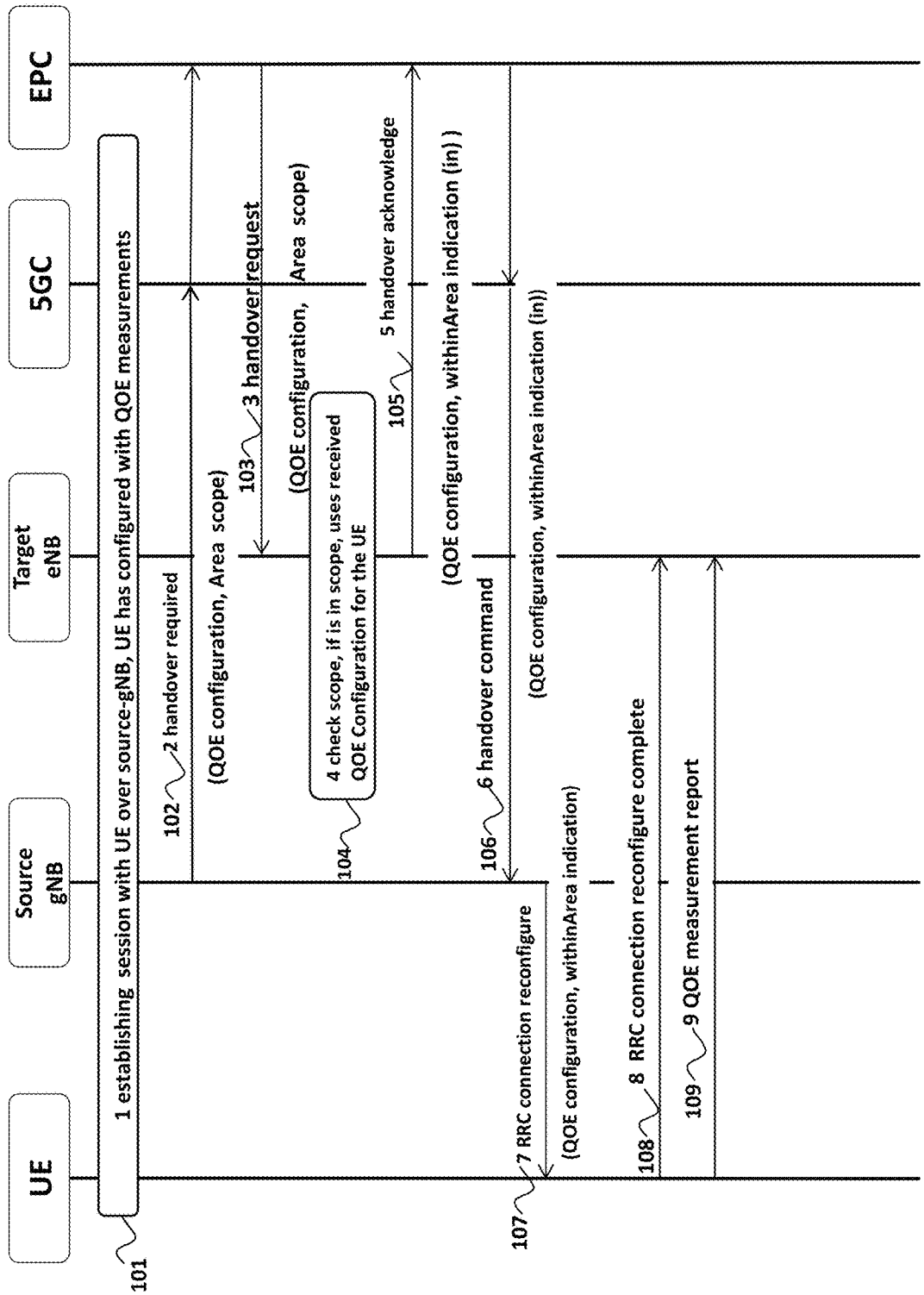
FIG. 1 depicts an example of message flow for quality of experience (QoE) measurements for a handover from 5G network to an LTE network.

FIG. 1 depicts an example of message flow for quality of experience (QoE) measurements for a handover from 5G network to an LTE network.

At 101, the UE is connected to the source gNB, and the UE is configured for QoE measurements associated with at least one RAT (e.g, 5G RAT or LTE RAT). The 5G core network (5GC) indicates the supported RAT type list of the configured QoE measurement to the gNB in a UE context/PDU session setup request message; or the OAM configures the supporting RAT type list of the configured QoE measurement at the gNB.

At 102, during mobility of the UE, the source gNB decides a target cell/target node for handover. In the case that the target cell is at an eNB and the current configured QoE measurement is supported in LTE RAT, the source gNB sends a NGAP message over the NG interface e.g., a handover required message to the 5G core network (5GC) to request the preparation of resources at the target cell, including the following information in the message:
  a) QoE area scope information including the inter RAT area scope which is used to define the area in terms or cells or tracking area/routing area/location area where the QoE measurement will occur.
  b) QoE configuration information including at least one of the following QoE measurement parameters:
  1. A supported RAT type list to indicate which RATs can support the QoE measurement associated with a service type;
  2. At least one RAT related OoE configuration associated with a specific RAT. One configuration includes at least one of the following: a QoE metric of radio network layer measurement configuration, a measurement triggering configuration to support event-based and time-based QoE measurement triggering;
  3. An allowed one or more measured slices to configure and collect QoE information per slice associated with the configured QoE area scope or an allowed one or more measured slices associated with the specific area scope, e.g., a list of cells, a list of tracking area/routing area/location area;
  4. Reporting server information; or
  5. QoE Measurement collection identifier for the session.

At 103, the evolved packet core (EPC) of the LTE core network (CN) receives the handover required message forwarded by the 5GC, the EPC sends an S1 application protocol (AP) message, e.g, handover request over the S1 interface to the target eNB for requesting the preparation of resources at target eNB, including the QoE area scope information, and QoE configuration information received from 5GC in the message.

At 104, the target eNB checks the received QoE area scope information. If the target cell is in the scope where the QoE measurement shall take place, the target eNB uses the received QoE Configuration information for the UE.

At 105, the target eNB sends a S1AP message e.g, handover acknowledge message over the S1 interface to the EPC to inform the required resource has been successfully setup, including QoE configuration information and the withinArea indication to indicate the target cell is inside the scope in the message.

At 106, after the required resource has been successfully setup at the target eNB, the 5GC sends a next generation application protocol (NGAP) message e.g, handover command over the NG interface to the source gNB to inform the source gNB that resources for the handover have been prepared at the target eNB, including the QoE configuration information and the withinArea indication to indicate the target cell is inside the scope in the message At 107, the source gNB sends a radio resource control (RRC) reconfigure message to UE to request UE to handover to the target eNB, including the QoE Configuration information and the withinArea indication to indicate the target cell is inside the scope where the QoE measurement shall take place in the message.

At 108, the UE sends a RRC reconfigure complete message to the target eNB to establish connection with the target eNB.

At 109, the UE checks the received withinArea indication. If the target cell is inside the scope where the QoE measurement will take place, the UE performs the QoE measurements according the received the QoE configuration information. The UE checks the received allowed measured slice(s). If the current measured slice is in the allowed measured slice(s) and the allowed measured slice(s) is configured for all QoE area scope, the UE performs QoE measurements for the slice in all area scope. If the current measured slice is in the allowed measured slice(s) and the allowed measured slice(s) is configured for specific QoE area scope, the UE performs QoE measurements for the slice in specific area scope, e.g., one or more cells, one or more tracking area/routing area/location area. The UE sends a QoE measurement report to the target eNB.

Figure 2:
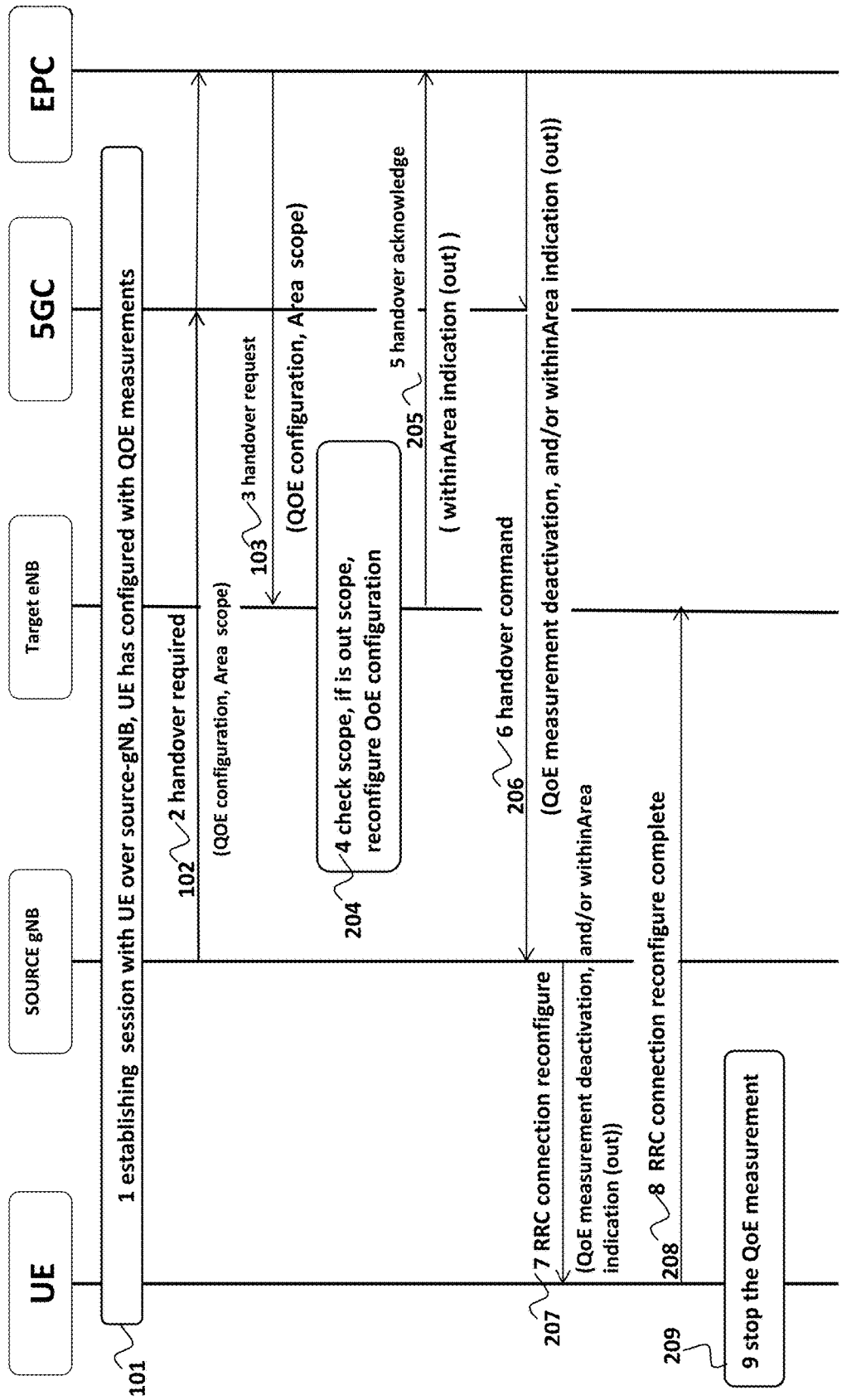
FIG. 2 depicts an example of message flow for QoE measurements failure for a handover from a 5G network to an LTE network.

FIG. 2 depicts an example of message flow for QoE measurements failure for a handover from a 5G network to an LTE network. Messages corresponding to 101-103 in FIG. 2 are the same as those in FIG. 1.

At 204, the target eNB checks the received QoE area scope information. If the target cell is out the scope where the QoE measurement shall take place, the target eNB will not use the received QoE Configuration information for the UE.

At 205, the target eNB sends a S1AP message e.g, handover acknowledge message over the S1 interface to the EPC to inform the required resource has been successfully setup, including the withinArea indication to indicate the target cell is outside the scope in the message.

At 206, after the required resource has been successfully setup at the target eNB, the 5GC sends a NGAP message e.g, handover command over the NG interface to the source gNB to inform the source gNB that resources for the handover have been prepared at the target eNB, including the QoE measurement deactivation indication and/or the withinArea indication to indicate the target cell is outside the scope in the message At 207, the source gNB sends a RRC reconfigure message to the UE to request the UE to handover to the target eNB, including the QoE measurement deactivation indication and/or the withinArea indication to indicate the target cell is outside the scope in the message.

At 208, the UE sends a RRC reconfigure complete message to the target eNB to establish connection with the target eNB.

At 209, if the withinArea indication is received, the UE checks the received withinArea indication. If the target cell is outside the scope where the QoE measurement will take place, the UE stops the QoE measurements. If the QoE measurement deactivation indication is received, the UE stops the QoE measurements.

Figure 3:
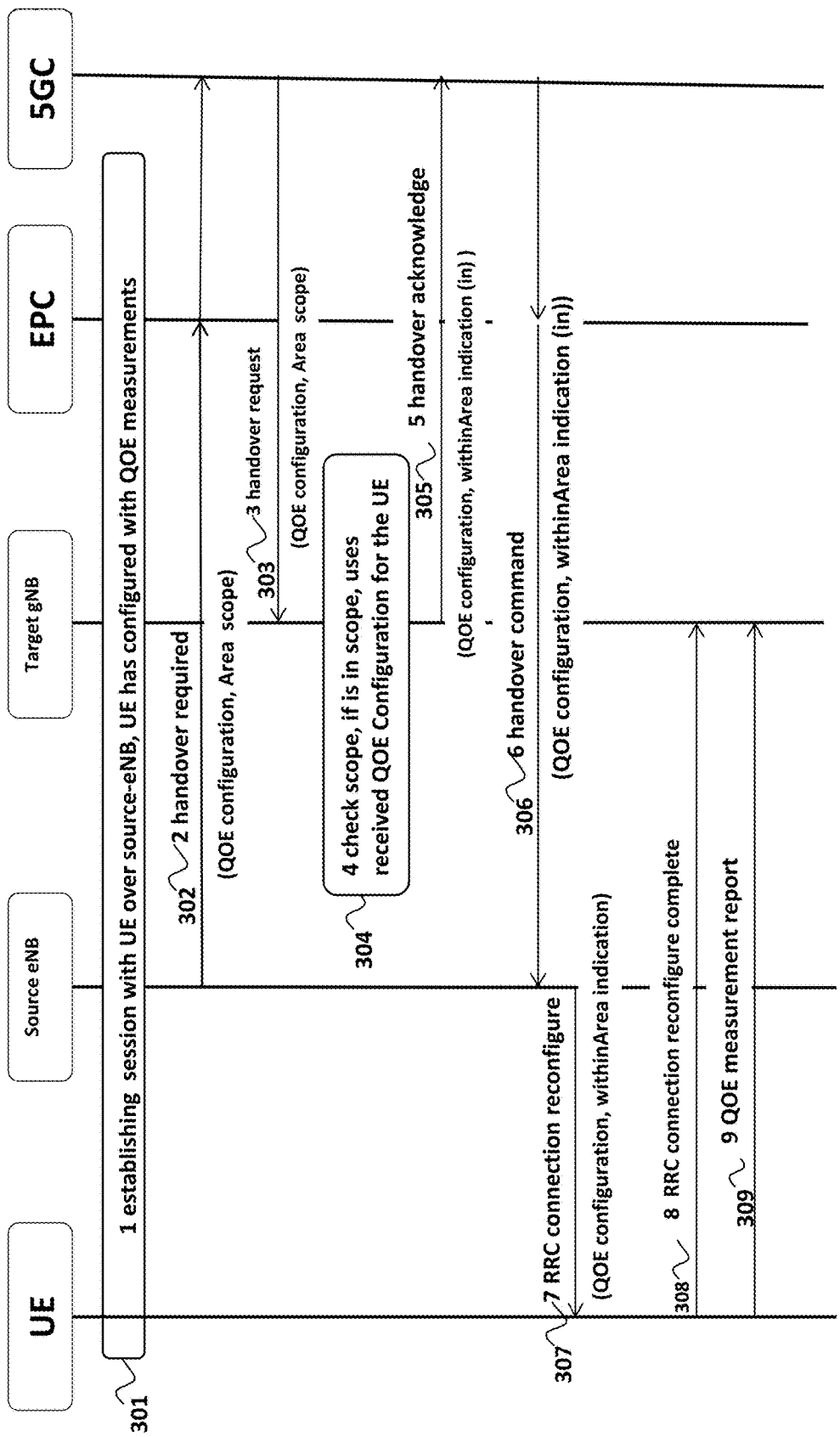
FIG. 3 depicts an example of message flow for QoE measurement continuity for a handover from an LTE network to a 5G network.

FIG. 3 depicts an example of message flow for QoE measurement continuity for a handover from an LTE network to a 5G network.

At 301, the UE is connected to the source eNB, and the UE is configured for QoE measurements associated with at least one RAT (e.g, 5G RAT or LTE RAT). The EPC will indicate the supported RAT type list of the configured QoE measurement to the eNB in the UE context/Evolved Radio Access Bearer (E-RAB) setup request message; or the OAM configures the supporting RAT type list of the configured QoE measurement at the eNB.

At 302, During the mobility, The source eNB decides a target cell/target node for handover. In the case of the target cell is at a gNB and the current configured QoE measurement is supported in 5G RAT, the source eNB sends a S1AP message over S1 interface e.g., handover required message to the EPC (LTE CN) to request the preparation of resources at the target cell, including the following information in the message:

a) The QoE area scope information including the inter RAT area scope which is used to define the area in terms or cells or tracking area/routing area/location area where the QoE measurement will take place;
 b) QoE configuration information, including at least one of the following QoE measurement parameters:
 1 A supported RAT type list, to indicate which RAT can support the QoE measurement associated with a service type;
 2. At least one RAT related OoE configuration associated with a specific RAT. A configuration includes at least one of the following: QoE metric of radio network layer measurement configuration; measurement triggering configuration to support event-based and time-based QoE measurement triggering;
 3. An allowed one or more measured slices to support configure and collect QoE per slice information associated with the configured QoE area scope or allowed one or more measured slices associated to the specific area scope, e.g., list of cells, list of tracking area/routing area/location area;
 4. Reporting server information; or
 5. QoE measurement collection identifier for the session.

At 303, the 5GC receives the handover required message forwarded by the EPC, the 5GC sends a NGAP message, e.g., handover request message over the NG interface to the target gNB for requesting the preparation of resources at target gNB, including the QoE area scope information, and QoE configuration information received from EPC in the message.

At 304, the target gNB checks the received QoE area scope information. If the target cell is in the scope where the QoE measurement shall take place, the target gNB uses the received QoE Configuration information for the UE.

At 305, the target gNB sends a NGAP message, e.g., handover acknowledge over the NG interface to the 5GC to inform the required resource has been successfully setup, including QoE configuration information and the withinArea indication to indicate the target cell is inside the scope in the message.

At 306, after the required resource has been successfully setup at the target gNB, the EPC sends a S1AP message, e.g., handover command message over the S1 interface to the source eNB to inform the source eNB that resources for the handover have been prepared at the target gNB, including the QoE configuration information and the withinArea indication to indicate the target cell is inside the scope in the message At 307, the source eNB sends a RRC reconfigure message to UE to request UE to handover to the target gNB, including the QoE configuration information and the withinArea indication to indicate the target cell is inside the scope where the QoE measurement shall take place in the message.

At 308, the UE sends a RRC reconfigure complete message to the target gNB to establish connection with the target gNB.

At 309, the UE checks the received withinArea indication. If the target cell is inside the scope where the QoE measurement shall take place, the UE performs the QoE measurements according the received the QoE configuration information, the UE checks the received allowed measured slice(s). If the current measured slice is in the allowed measured slice(s) and the allowed measured slice(s) is configured for all QoE Area Scope, the UE performs QoE measurements for the slice in the area scope. If the current measured slice is in the allowed measured slice(s) and the allowed measured slice(s) is configured for specific QoE area scope, the UE performs QoE measurements for the slice in specific area scope, e.g., one or more cells, one or more tracking area/routing area/location area. The UE sends the QoE measurement report to the target gNB.

Figure 4:
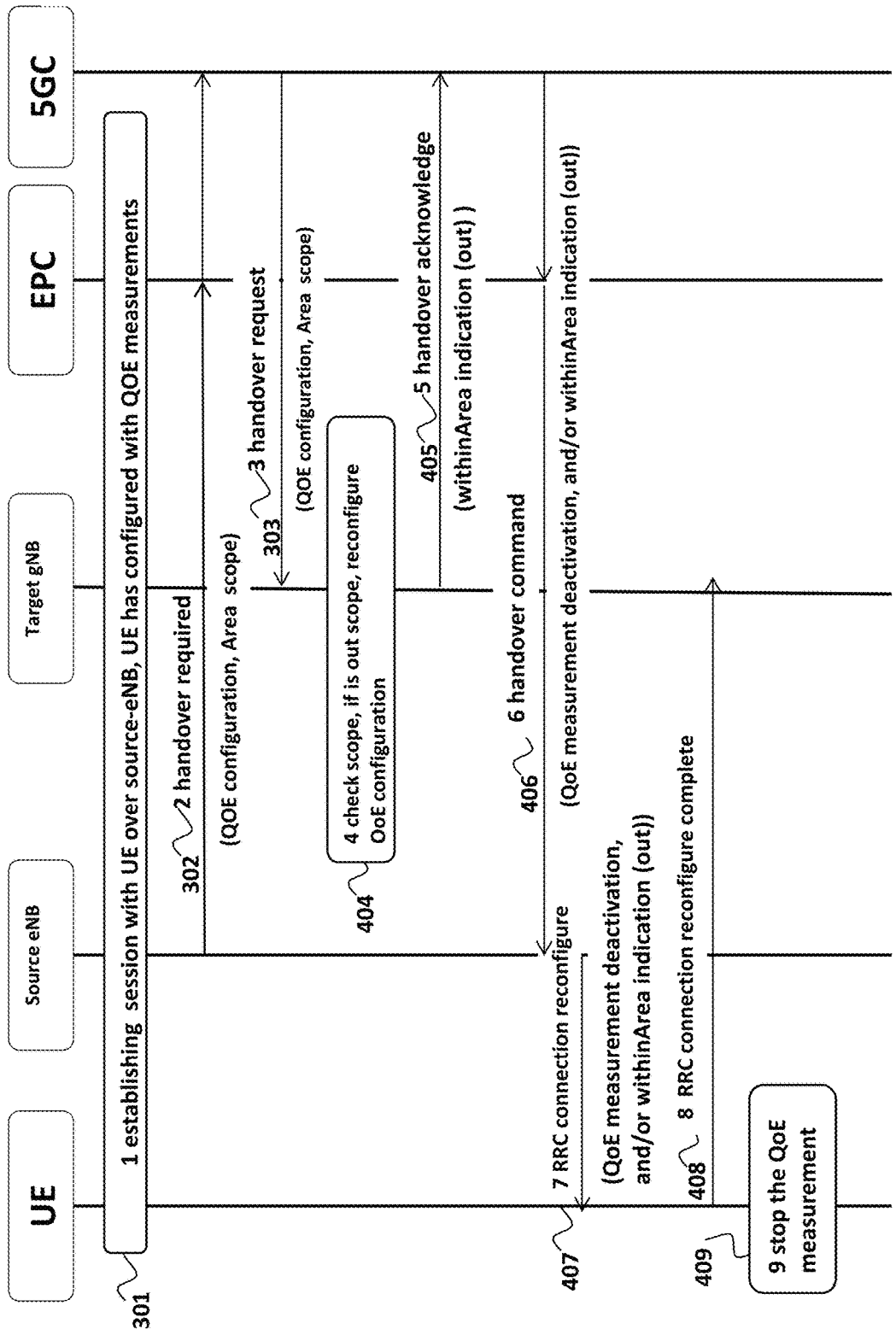
FIG. 4 depicts an example of message flow for QoE measurements failure for a handover from an LTE network to a 5G network.

FIG. 4 depicts an example of message flow for QoE measurements failure for a handover from a an LTE network to a 5G network. Messages corresponding to 301-303 in FIG. 4 are the same as those in FIG. 3.

At 404, the target gNB checks the received QoE Area Scope information. If the target cell is out the scope where the QoE measurement will take place, the target gNB will not use the received QoE Configuration information for the UE.

At 405, the target gNB sends a NGAP message e.g., handover acknowledge message over the NG interface to the 5GC to inform the required resource has been successfully setup, including the withinArea indication to indicate the target cell is outside the scope in the message.

At 406, after the required resource has been successfully setup at the target gNB, the EPC sends a S1AP message e.g., handover command message over the S1 interface to the source eNB to inform the source eNB that resources for the handover have been prepared at the target gNB, including the QoE measurement deactivation indication and/or the withinArea indication to indicate the target cell is outside the scope in the message At 407, the source eNB sends RRC reconfigure message to UE to request UE to handover to the target gNB, including the QoE measurement deactivation indication and/or the withinArea indication to indicate the target cell is outside the scope in the message.

At 408, the UE sends a RRC reconfigure complete message to the target gNB to establish connection with the target gNB.

At 409, if the withinArea indication is received, the UE checks the received withinArea indication. If the target cell is outside the scope where the QoE measurement will take place, the UE shall stop the QoE measurements. If the QoE measurement deactivation indication is received, the UE will stop the QoE measurements.

Figure 5:
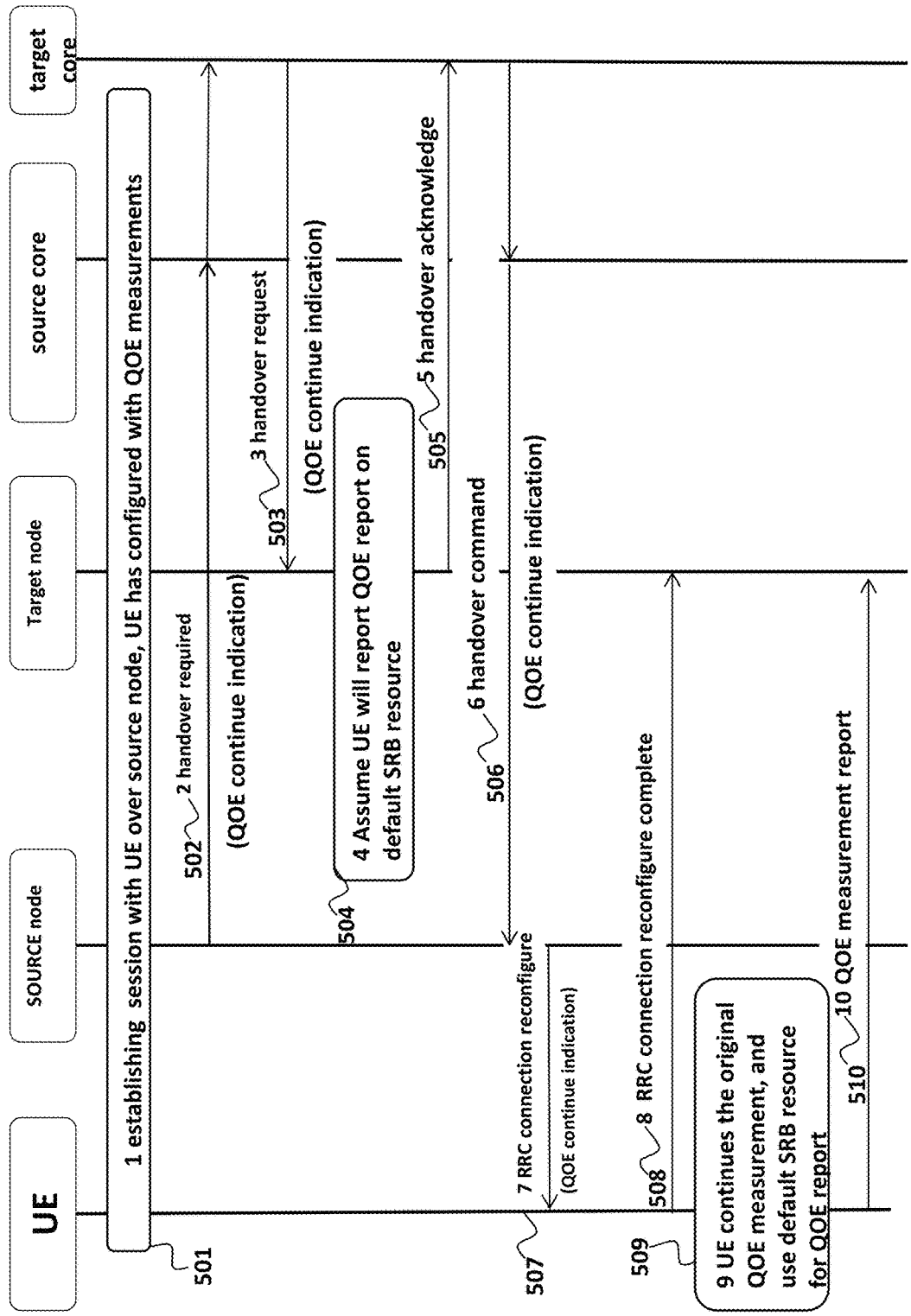
FIG. 5 depicts an example of message flow for an inter-RAT QoE measurement continuity based on an original QoE configuration.

FIG. 5 depicts an example of message flow for an inter-RAT QoE measurement continuity based on an original QoE configuration.

At 501, the UE is connected to the source node, and the UE is configured for QoE measurements.

At 502, during mobility of the UE, the source node determines a target cell/target node for handover. The source node sends a handover required message to the source node core to request the preparation of resources at the target cell, including an indication in the message for the QoE measurements to continue and that the target node UE QoE report is not deactivated.

At 503, the target node core receives the indication to continue QoE measurements forwarded by the source core. The target core sends a handover request to the target node requesting preparation of resources at target node, including the indication for QoE measurements to continue in the message.

At 504, the target node receives the indication to continue QoE measurements. The UE reports the QoE report on a default SRB resource to the target node.

At 505, the target node sends a handover acknowledge message to the target node core to inform the required resource has been successfully setup.

At 506, the source node core sends a handover command message to the source node to inform the source node that resources for the handover have been prepared at the target node, including the QoE measurement continue indication in the message At 507, the source node sends a RRC reconfigure message to the UE to request the UE to handover to the target node, including the QoE measurement continue indication in the message to inform UE to continue QoE measurement.

At 508, the UE sends a RRC reconfigure complete message to the target node to establish connection with the target node.

At 509, the UE continues the QoE measurement based on the original QoE measurement configuration and use default SRB resource for the QoE report.

At 510, the UE sends the QoE measurement report to the target node.

Figure 6:
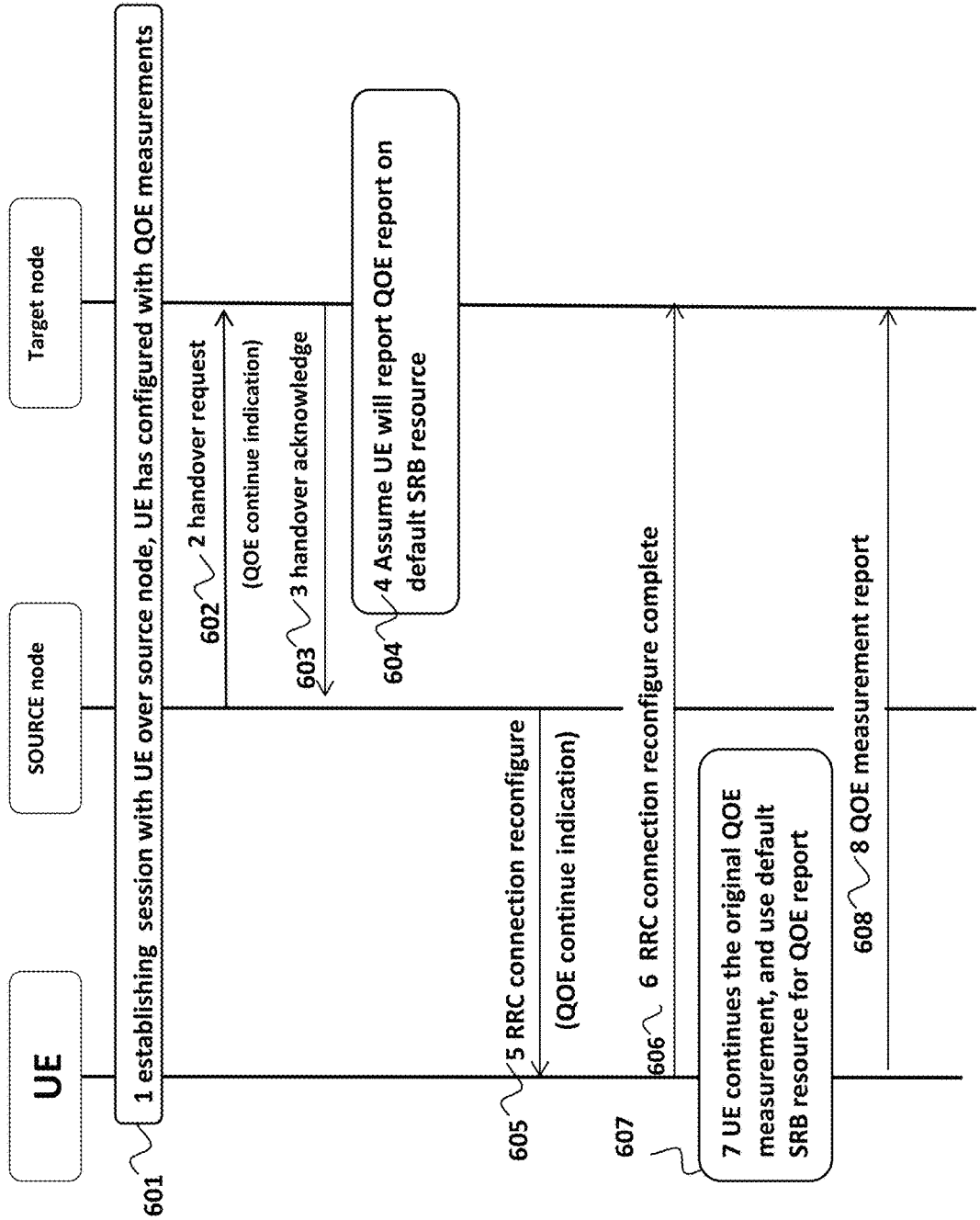
FIG. 6 depicts another example of message flow for an inter-RAT QoE measurement continuity based on an original QoE configuration.

FIG. 6 depicts another example of message flow for an inter-RAT QoE measurement continuity based on an original QoE configuration.

At 601, the UE is connected to the source node, and the UE is configured for QoE measurements.

At 602, during mobility of the UE, the source node determines a target cell/target node for handover. The source node sends a handover request message to the target node to request the preparation of resources at the target cell, including an indication in the message for the QoE measurements to continue and that the target node UE QoE report is not deactivated At 603, the target node sends a handover acknowledge message to the source node to inform the required resource has been successfully setup.

At 604, the UE will report a QoE report on a default SRB resource.

At 605, the source node sends an RRC reconfigure message to UE to request UE to handover to the target node, including the QoE measurement continue indication in the message to inform UE to continue QoE measurement.

At 606, the UE sends an RRC reconfigure complete message to the target node to establish connection with the target node.

At 607, the UE continues QoE measurements based on the original QoE measurement configuration, and use default SRB resource for QoE report At 608, UE sends the QoE measurement report to the target node.

Figure 7:
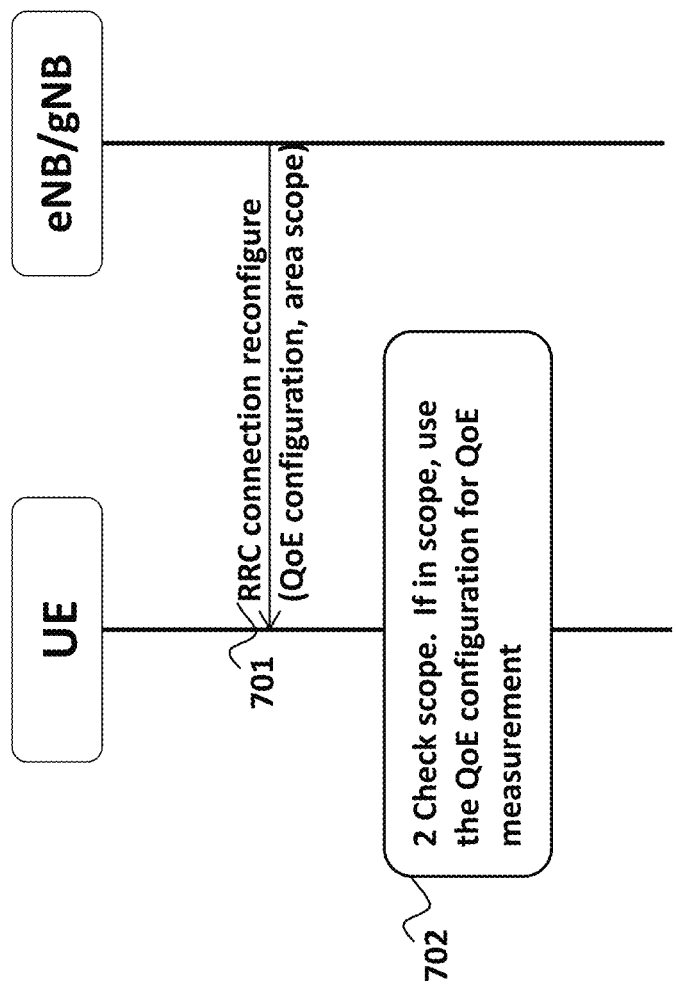
FIG. 7 depicts an example of message flow for a UE performing an area scope.

FIG. 7 depicts an example of message flow for a UE performing an area scope.

At 701, the gNB/eNB sends a RRC message to the UE, including QoE area scope information and/or QoE configuration information.

At 702, the UE checks the area scope information, determining to use the received QoE configuration information or the original QoE configuration information or receives new QoE configuration for the QoE measurement in the case that the UE is in the area, or determining to stop the QoE measurement in the case that UE is outside an area.

Figure 8:
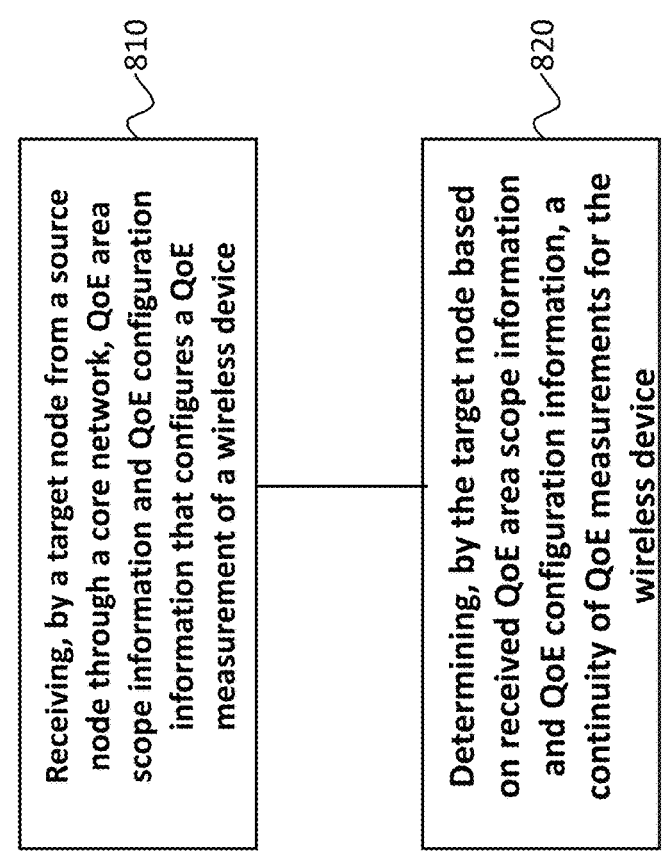
FIG. 8 depicts an example of a method for wireless communication.

FIG. 8 shows an example of a method 800 for wireless communication. At 810, in some embodiments of the disclosed technology, the method includes receiving, by a target node from a source node through a core network, QoE area scope information and QoE configuration information that configures a QoE measurement of a wireless device. At 820, the method includes determining, by the target node based on received QoE area scope information and QoE configuration information, a continuity of QoE measurements for the wireless device.

Figure 9:
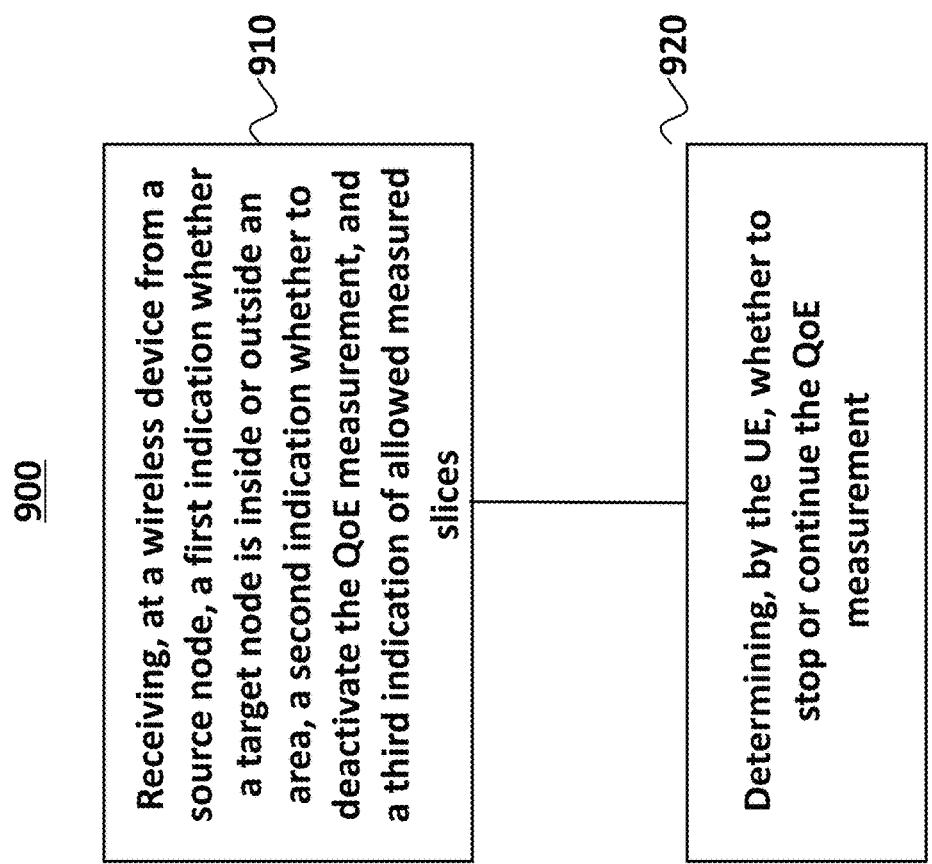
FIG. 9 depicts another example of a method for wireless communication.

FIG. 9 shows another example of a method 900 for wireless communication. At 910, in some embodiments of the disclosed technology, the method includes receiving, at a wireless device from a source node, a first indication whether a target node is inside or outside an area, a second indication whether to deactivate the QoE measurement, and a third indication of allowed measured slices. At 920, the method includes determining, by the UE, whether to stop or continue the QoE measurement.

Figure 10:
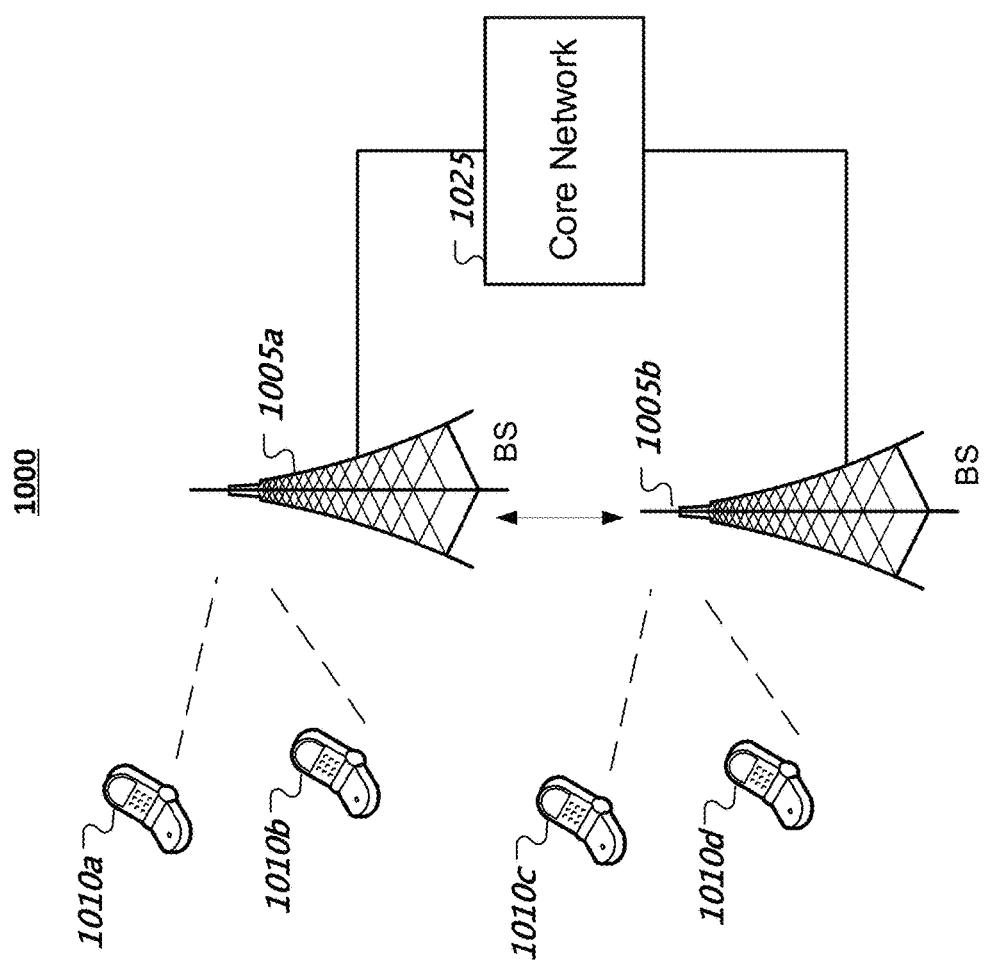
FIG. 10 depicts an example of a wireless communication system.

FIG. 10 shows an example of a wireless communication system 1000 where techniques in accordance with one or more embodiments of the present technology can be applied. A wireless communication system 1000 can include one or more base stations (BSs) 1005*a*, 1005*b*, one or more wireless devices 1010*a*, 1010*b*, 1010*c*, 1010*d*, and a core network 1025. A base station 1005*a*, 1005*b* can provide wireless service to wireless devices 1010*a*, 1010*b*, 1010*c* and 1010*d* in one or more wireless sectors. In some implementations, a base station 1005*a*, 1005*b* includes directional antennas to produce two or more directional beams to provide wireless coverage in different sectors. The base station 1005*a*, 1005*b* may communicate directly with one another wirelessly or via a wired interface including a direct wired interface, a wired network, or the Internet.

The core network 1025 can communicate with one or more base stations 1005*a*, 1005*b*. The core network 1025 provides connectivity with other wireless communication systems and wired communication systems. The core network may include one or more service subscription databases to store information related to the subscribed wireless devices 1010*a*, 1010*b*, 1010*c*, and 1010*d*. A first base station 1005*a* can provide wireless service based on a first radio access technology, whereas a second base station 1005*b* can provide wireless service based on a second radio access technology. The base stations 1005*a* and 1005*b* may be co-located or may be separately installed in the field according to the deployment scenario. The wireless devices 1010*a*, 1010*b*, 1010*c*, and 1010*d* can support multiple different radio access technologies. The techniques and embodiments described in the present document may be implemented by the base stations described in the present document or by wireless devices.

Figure 11:
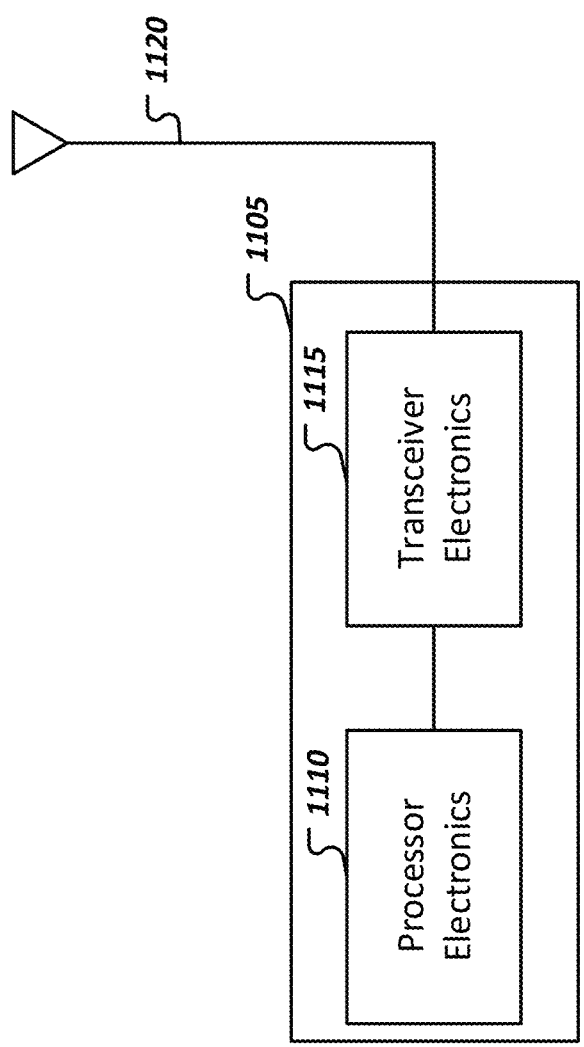
FIG. 11 depicts a block diagram representation of a portion of a radio station.

FIG. 11 is a block diagram representation of a portion of a radio station in accordance with one or more embodiments of the present technology can be applied. A radio 1105 such as a base station, network node, or a wireless device (or UE) can include electronics 1110 such as a microprocessor that implements one or more of the wireless techniques presented in this document. The radio 1105 can include transceiver electronics 1115 to send and/or receive wireless signals over one or more communication interfaces such as antenna 1120. The radio 1105 can include other communication interfaces for transmitting and receiving data. Radio 1105 can include one or more memories (not explicitly shown) configured to store information such as data and/or instructions. In some implementations, the processor electronics 1110 can include at least a portion of the transceiver electronics 1115. In some embodiments, at least some of the disclosed techniques, modules or functions are implemented using the radio 1105. In some embodiments, the radio 1105 may be configured to perform the methods described in this document.

Quality of Service (QOS) is related to measurements of network characteristics and behavior. Network providers give performance guarantees based on these measurements. Quality of Experience (QoE) is related to the impact of network behavior on an end user. For QoE, some imperfections may go unnoticed and some imperfections may render an application unusable. Sometimes, QoE may not be captured by network measurements. For example, a 5% packet loss might not affect QoE if it affects background processes but would affect QoS measurements.

The technical solutions described by the following clauses may be preferably implemented by some embodiments. In the technical solutions described herein in clause format, the network node may be a network device, target node, source node, gNB, eNB, or a network-side equipment such as a base station. A wireless device may be a user equipment, a mobile station, user device, or another wireless device. FIG. 10 shows an example hardware platform for implementing the network node or a wireless device.

Clause 1. A method for wireless communication, comprising: receiving, by a target node from a source node through a core network, quality of experience (QoE) area scope information and QoE configuration information that configures a QoE measurement of a wireless device; and determining, by the target node based on received QoE area scope information and QoE configuration information, a continuity of QoE measurements for the wireless device.

Clause 2. The method of clause 1, wherein the source node is a next generation Node B (gNB) and the target node is an enhanced Node B (eNB).

Clause 3. The method of clause 1, wherein the source node is an eNB and the target node is a gNB.

Clause 4. The method of clause 2, further comprising: receiving, by the target from to an evolved packet core (EPC), a handover request message requesting preparation of resources at the target node for handover, wherein the resources comprise the QoE area scope information and the QoE configuration information.

Clause 5. The method of clause 3, further comprising: receiving, by the target node from a fifth-generation core network, a handover request message requesting preparation of resources at the target node for handover, wherein the resources comprise the QoE area scope information and the QoE configuration information.

Clause 6. The method of clause 1, further comprising: determining to use the received QoE configuration information at the target node in a case that the target node is in an area.

Clause 7. The method of clause 2, further comprising: transmitting, by the target from to an evolved packet core (EPC), a handover acknowledge message notifying the EPC that QoE resources have been successfully set up, wherein the resources comprise QoE configuration information, and an indication that the target node is inside or outside an area.

Clause 8. The method of clause 3, further comprising: transmitting, by the target from to a fifth-generation core network, a handover acknowledge message notifying the EPC that QoE resources have been successfully set up, wherein the resources comprise QoE configuration information, and an indication that the target node is inside or outside an area.

Clause 9. A method wireless communication, comprising: transmitting, by a source node to a target node, through a core network, quality of experience (QoE) area scope information and QoE configuration information that configures a QoE measurement of a wireless device.

Clause 10. The method of clause 9, wherein the source node is a next generation Node B (gNB) and the target node is an enhanced Node B (eNB).

Clause 11. The method of clause 9, wherein the source node is an eNB and the target node is a gNB.

Clause 12. The method of clause 10, wherein the source node receives a supporting RAT type list of the configured QoE measurement in a UE context/PDU session setup request message sent by a fifth-generation core network.

Clause 13. The method of clause 11, wherein the source node receives the supporting RAT type list of the configured QoE measurement in a UE context/E-RAB (Evolved Radio Access Bearer) setup request message sent by EPC.

Clause 14. The method of clause 9, wherein an operations, administration and management (OAM) function configures a supported radio access technology (RAT) type list of the QoE measurement at the source node.

Clause 15. The method of clause 10, further comprising: transmitting, by the source node to a fifth-generation core network, a handover required message requesting preparation of resources at the target node for handover, wherein the resources comprise the QoE area scope information and the QoE configuration information.

Clause 16. The method of clause 11, further comprising: transmitting, by the source node to an evolved packet core (EPC), a handover required message requesting preparation of resources at the target node for handover, wherein the resources comprise the QoE area scope information and the QoE configuration information.

Clause 17. The method of clause 10, further comprising: receiving, by the source node from a fifth-generation core network (5GC), a handover command message notifying the source node that resources for a handover have been prepared at the target node, wherein the resources comprise at least one of: the QoE configuration information, an indication that the target cell is inside or outside an area for the QoE measurement, or a QoE deactivation indication to stop the QoE measurement.

Clause 18. The method of clause 11, further comprising: receiving, by the source node from an evolved packet core (EPC), a handover command message notifying the source node that resources for a handover have been prepared at the target node, wherein the resources comprise at least one of: the QoE configuration information, an indication that the target cell is inside or outside an area for the QoE measurement, or a QoE deactivation indication to stop the QoE measurement.

Clause 19. The method of clause 10, further comprising: transmitting, by the source node to a wireless device in a case that the source node received an indication that the target cell is outside an area or receives a QoE deactivation indication to stop the QoE measurement, a radio resource control (RRC) reconfiguration message to request a stop to the QoE measurement, wherein the RRC reconfiguration message comprises at least one of: the QoE deactivation indication, or an indication that the target cell is outside the area.

Clause 20. The method of clause 10, further comprising: transmitting, by the source node to a wireless device in a case that the source node received an indication that the target cell is inside an area, a radio resource control (RRC) reconfiguration message to request a continuation of the QoE measurement, wherein the RRC reconfiguration message comprises: the QoE configuration information, and an indication that the target cell is inside the area.

Clause 21. A method of wireless communication, comprising: receiving, at a wireless device from a source node, a first indication whether a target node is inside or outside an area, a second indication whether to deactivate the QoE measurement, and a third indication of allowed measured slices; and determining, by the wireless device, whether to stop or continue the QoE measurement.

Clause 22. The method of clause 21, further comprising: performing the QoE measurement according to QoE configuration information, wherein the target node is inside the area; and transmitting a QoE measurement report to the target node.

Clause 23. The method of clause 21, further comprising: determining from the third indication whether a current measured slice is allowed and in the area; and performing the QoE measurement for the current measured slice.

Clause 24. The method of any of clauses 1-23, wherein the QoE area scope information includes the inter radio access technology (RAT) area scope defining a measurement area in terms or cells or tracking area/routing area/location area for the QoE measurement.

Clause 25. The method of any of clauses 1-24, wherein the QoE configuration information comprises a supported RAT type list to indicate which RAT can support the QoE measurement associated with a service type.

Clause 26. The method of any of clauses 1-25, wherein the QoE configuration information comprises at least one RAT related QoE configuration associated with a specific RAT, wherein one configuration includes at least one of the following: a QoE metric of radio network layer measurement configuration, a measurement triggering configuration to support event-based and time-based QoE measurement triggering.

Clause 27. The method of any of clauses 1-26, wherein the QoE configuration information comprises allowed one or more measured Slices associated with a configured QoE area scope or allowed one or more measured slices associated to a specific area scope including one or more cells, one or more tracking area/routing area/location area.

Clause 28. The method of any of clauses 1-27, wherein the QoE configuration information comprises reporting server information.

Clause 29. The method of any of clauses 1-28, wherein the QoE configuration information comprises a QoE measurement collection identifier for a session.

Clause 30. A method of wireless communication, comprising: receiving, at a wireless device in a message from a network node, QoE information comprising one or more of area scope information and QoE configuration information; and determining, at the wireless device, to continue a QoE measurement in a case that the wireless device is in an area, or determining to stop the QoE measurement in another case that the wireless device is outside the area.

Clause 31. The method of clause 30, wherein the message is an RRC message.

Clause 32. The method of clause 30, wherein network node is an enhanced Node B or a next generation Node B.

Clause 33. An apparatus comprising a processor configured to perform any one or more of clauses 1 to 32.

Clause 34. A computer-readable medium including instructions that when executed by a processor perform a method recited in any one or more of clauses 1 to 32.

It will be appreciated that the present document discloses techniques that can be embodied in various embodiments to establish and manage wireless network. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

What is claimed is:

1. A method for wireless communication, comprising:
    receiving, by a target node from a source node through a core network, quality of experience (QoE) area scope information and QoE configuration information that configures a QoE measurement of a wireless device,
    wherein the source node is a next generation Node B (gNB) and the target node is an enhanced Node B (eNB), and the QoE configuration information includes a supporting RAT type list of the configured QoE measurement in a UE context/PDU session setup request message received by the source node from a fifth-generation core network, or
    wherein the source node is an eNB and the target node is a gNB, and the QoE configuration information includes a supporting RAT type list of the configured QoE measurement in a UE context/Evolved Radio Access Bearer (E-RAB) setup request message sent by an evolved packet core (EPC); and
    determining, by the target node based on received QoE area scope information and QoE configuration information, a continuity of QoE measurements for the wireless device.

2. The method of claim 1, further comprising:
    receiving, by the target node from the EPC, a handover request message requesting preparation of resources at the target node for handover, wherein the resources comprise the QoE area scope information and the QoE configuration information.

3. The method of claim 1, further comprising:
    receiving, by the target node from the fifth-generation core network, a handover request message requesting preparation of resources at the target node for handover, wherein the resources comprise the QoE area scope information and the QoE configuration information.

4. The method of claim 1, further comprising:
    determining to use the received QoE configuration information at the target node in a case that the target node is in an area.

5. The method of claim 1, further comprising:
    transmitting, by the target node to the EPC, a handover acknowledge message notifying the EPC that QoE resources have been successfully set up, wherein the resources comprise QoE configuration information, and an indication that the target node is inside or outside an area.

6. The method of claim 1, further comprising:
    transmitting, by the target node to the fifth-generation core network, a handover acknowledge message notifying the EPC that QoE resources have been successfully set up, wherein the resources comprise QoE configuration information, and an indication that the target node is inside or outside an area.

7. The method of claim 1, wherein the QoE area scope information includes an inter radio access technology (RAT) area scope defining a measurement area in terms of cells or tracking area/routing area/location area for the QoE measurement.

8. The method of claim 1, wherein the QoE configuration information comprises at least one RAT related QoE configuration associated with a specific RAT, wherein one configuration includes at least one of the following: a QoE metric of radio network layer measurement configuration, or a measurement triggering configuration to support event-based and time-based QoE measurement triggering.

9. The method of claim 1, wherein the QoE configuration information comprises allowed one or more measured Slices associated with a configured QoE area scope or allowed one or more measured slices associated to a specific area scope including one or more cells, one or more tracking area/routing area/location area.

10. The method of claim 1, wherein the QoE configuration information comprises a QoE measurement collection identifier for a session.

11. A method wireless communication, comprising:
    transmitting, by a source node to a target node, through a core network, quality of experience (QoE) area scope information and QoE configuration information that configures a QoE measurement of a wireless device,
    wherein an operations, administration and management (OAM) function configures a supported radio access technology (RAT) type list of the QoE measurement at the source node.

12. The method of claim 11, wherein the source node is a next generation Node B (gNB) and the target node is an enhanced Node B (eNB).

13. The method of claim 11, wherein the source node is an eNB and the target node is a gNB.

14. The method of claim 12, wherein the source node receives a supporting RAT type list of the configured QoE measurement in a UE context/PDU session setup request message sent by a fifth-generation core network.

15. The method of claim 13, wherein the source node receives the supporting RAT type list of the configured QoE measurement in a UE context/E-RAB (Evolved Radio Access Bearer) setup request message sent by EPC.

16. The method of claim 12, further comprising:
    transmitting, by the source node to a fifth-generation core network, a handover required message requesting preparation of resources at the target node for handover, wherein the resources comprise the QoE area scope information and the QoE configuration information.

17. The method of claim 13, further comprising:
transmitting, by the source node to an evolved packet core (EPC), a handover required message requesting preparation of resources at the target node for handover, wherein the resources comprise the QoE area scope information and the QoE configuration information.

18. The method of claim 12, further comprising:
receiving, by the source node from a fifth-generation core network (5GC), a handover command message notifying the source node that resources for a handover have been prepared at the target node, wherein the resources comprise at least one of:
the QoE configuration information,
an indication that the target node is inside or outside an area for the QoE measurement, or
a QoE deactivation indication to stop the QoE measurement.

* * * * *